United States Patent [19]

Bigott

[11] Patent Number: 4,640,404
[45] Date of Patent: Feb. 3, 1987

[54] TELESCOPIC ROLLER

[76] Inventor: Jeffry J. Bigott, 12832 Ponderosa Dr., Palos Heights, Ill. 60463

[21] Appl. No.: 756,037

[22] Filed: Jul. 17, 1985

[51] Int. Cl.⁴ .......................................... B65G 13/12
[52] U.S. Cl. ................................ 193/35 TE; 384/19
[58] Field of Search .............. 193/35 R, 35 TE, 35 J; 198/812, 594, 782, 831; 211/151, 175; 308/3.8, 6 R; 474/206

[56] References Cited

U.S. PATENT DOCUMENTS

| 2,172,381 | 9/1939 | Harris | 193/35 R |
| 2,445,960 | 7/1948 | Mapes | 193/35 TE |
| 4,557,374 | 12/1985 | Bode | 198/831 X |

FOREIGN PATENT DOCUMENTS 40397 6/1932 France .................................. 403/61
973439 11/1982 U.S.S.R. .......................... 193/35 TE Primary Examiner—Johnny D. Cherry
Assistant Examiner—Mary Beth O. Jones
Attorney, Agent, or Firm—Richard G. Kinney

[57] ABSTRACT

A telescoping roller conveyor is disclosed wherein interwoven rollers are provided on axles. The axles are linked to adjacent axles within siderails. The links allow the axle separation to expand a limited distance longitudinally as siderails are telescopically extended. The links are enclosed in channel-shaped telescoping siderails and do not project above the level of the rollers in any position and thus do not provide any obstruction to items moving over the rollers along the conveyor. The axles are seated into special round plastic bushings that aid the movement of the telescoping longitudinal siderails and the relative movement of the axles to and from each other.

8 Claims, 5 Drawing Figures

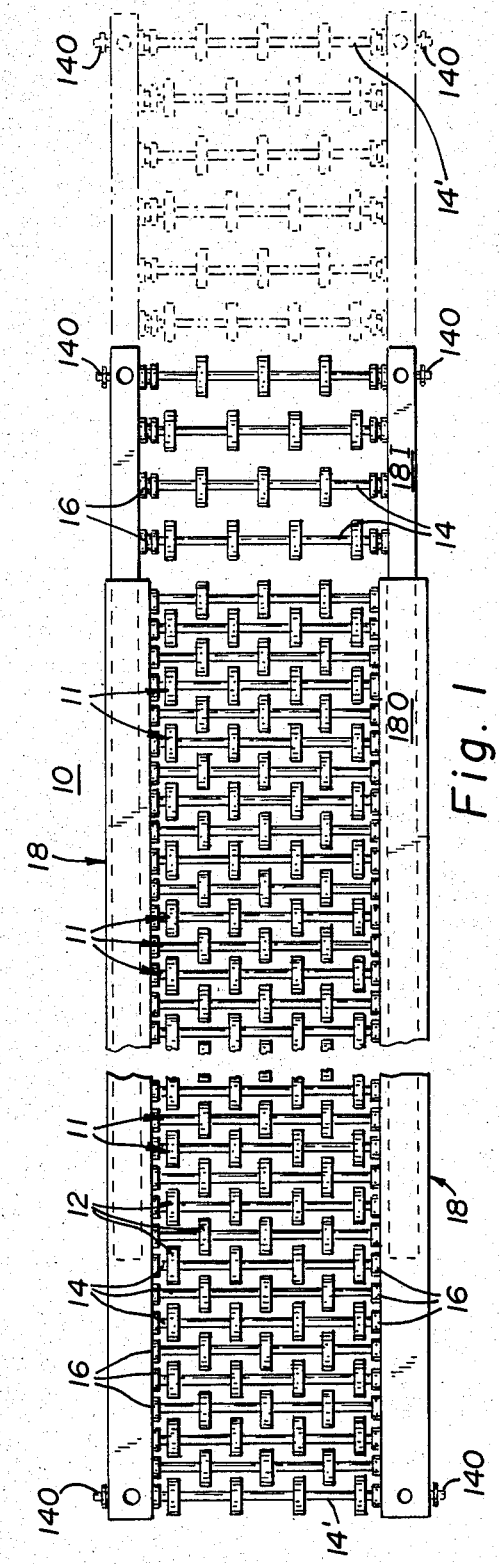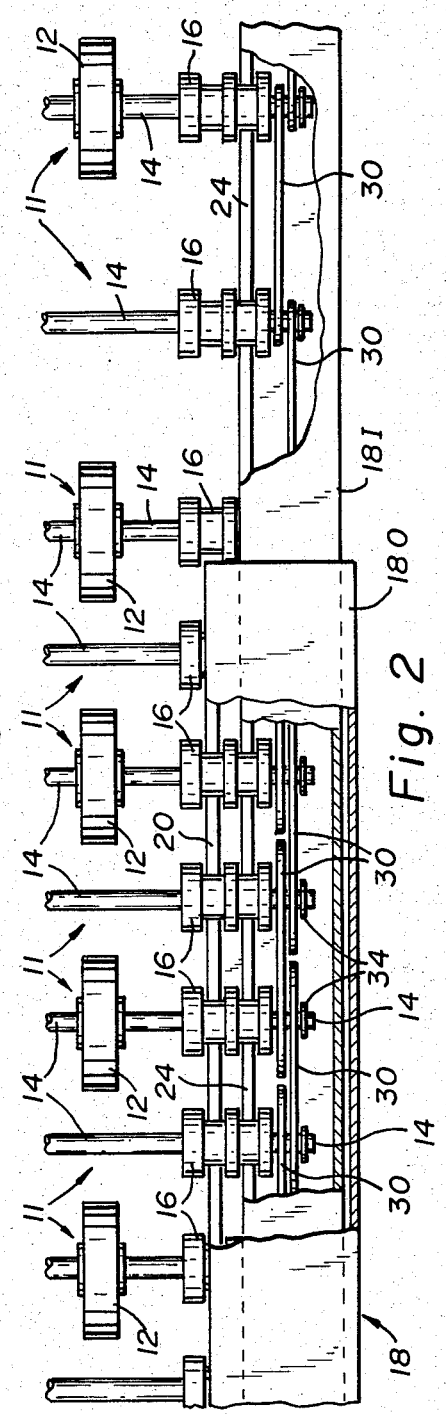

TELESCOPIC ROLLER

FIELD OF THE INVENTION

The present invention is directed to a new and improved telescoping or expanding roller conveyor.

BACKGROUND OF THE INVENTION

Various telescoping or extensible roller conveyors have been proposed. See, for example, U.S. Pat. Nos. 2,826,290; 2,445,960; 3,276,558; 2,266,650; 3,216,552 and RE 23,107.

These devices tend to be complex and difficult to use, often involve dangerous scissor-like action in closing or opening and/or tend to have mechanisms, such as those in Mapes U.S. Pat. Nos. Re. 23,107 and 2,445,960 that rise up above the level of the rollers as the conveyor extends so as to hang up items moving on it that are larger than, or travel slightly off the rollers.

Thus, there exists a need for a simple easy to use and safe telescoping conveyor that does not expose inter-moving parts so as to endanger the operators or items transported.

SUMMARY OF THE INVENTION

A telescoping conveyor constructed in accordance with the present invention comprises two sets of telescoping received channel-shaped siderails. A plurality of roller units made up of rollers mounted to roller axles, which axles span between the sets of siderails are provided. These roller units include rotatable bushings which receive the ends of the roller axles. The bushings are in turn seated in the siderails. A plurality of links, each spanning two adjacent axles, which links allow the relative distance between adjacent axles to expand and contract as the siderails extend are also provided. The links do not move or project upward as they allow such relative movement and are enclosed by said siderails to prevent accidental harm to the user or items conveyed.

The invention, together with the advantages thereof, may best be understood by reference to the following description taken in connection with the accompanying drawings, in the several figures of which, like reference numerals identify like elements.

BRIEF DESCRIPTION OF THE DRAWINGS

FIG. 1 is a top or plan view of a telescoping conveyor with a portion broken away with some interior parts shown in dashed outline, and showing the conveyor in a partly expanded position.

FIG. 2 is a fragmentary enlarged scale detailed plan view of a portion of the conveyor of FIG. 1 with parts broken away to show interior parts.

DESCRIPTION OF THE PREFERRED EMBODIMENT

Figure 3:
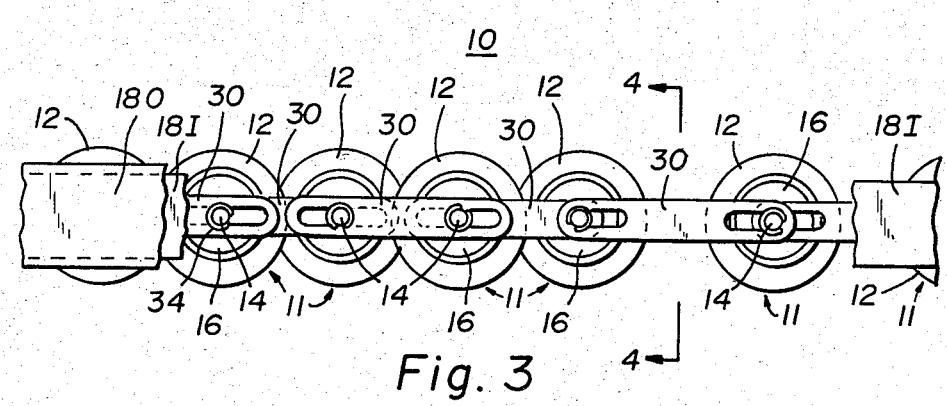
FIG. 3 is a fragmentary side or elevational view of a portion of the conveyor of FIGS. 1 and 2 with parts broken away to show interior parts.

Referring to FIG. 1 there is depicted a telescoping conveyor constructed in accordance with the principles of the present invention. This conveyor is generally designated by the number 10. The conveyor 10 has a plurality of roller units 11 which include a large number of individual rollers 12 each of which is mounted for rotation about one of a plurality of generally parallel transverse axles 14. As depicted a number of individual rollers 12 are mounted at spaced intervals along the axle 14. These rollers 12 are staggered so as to interweave when in the compressed state (the left side of FIG. 1). As is conventional for non-powered conveyors, the rollers 12 are positioned in a plane so that boxes and other items may easily move along these upper surfaces when the conveyor is positioned horizontally, preferably at a slight incline so that gravity aids in movement of the carried objects.

The roller units 11 comprise in addition to the rollers 12 and axles 14, a pair of unique bushings 16 in which the ends of the axles 14 are received. The bushings 16 are mounted in siderails 18 as better seen in FIGS. 2, 3 and 4.

The siderails 18 may telescopically expand being formed of two mating generally channel-shaped members 18O and 18I. The latter such member 18I is sized to loosely fit within the first.

Figure 4:
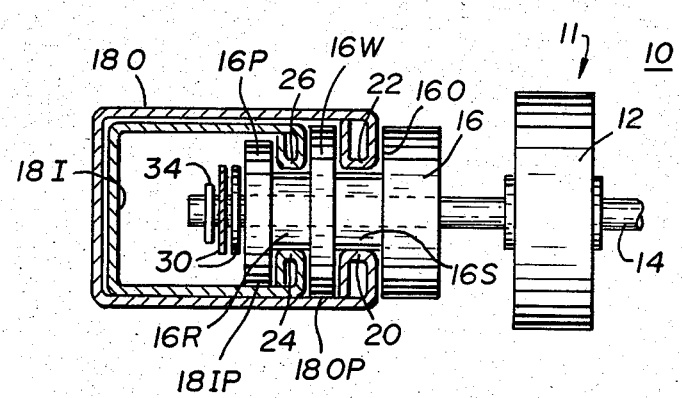
FIG. 4 is a detailed elevational view, partly in section, of a portion of the conveyor of FIGS. 1-3 as seen from the plane defined by the lines 4—4 in FIGS. 2 and 3.

The outer member 18O is, as best seen in FIG. 4, formed to have a generally rectilinear elongated upstanding lip or rail 20 and corresponding depending on lip or rail 22 formed at its inner edge.

Likewise the inner member 18I is channel-shaped with lips forming rails 24 and 26 inside of the rails 20, 22. Those rails are preferably, as shown, horizontally aligned with one another.

The conveyor 10 is constructed so as to be essentially symmetrical through its central horizontal plane.

The bushings 16 which are preferably of one piece of nylon or other low friction plastic, centrally receive the shaft or axle 14. The bushings 16 are generally cylindrical and spool-like in shape with a first circular race or groove 16O formed therein to loosely receive the lips or rails 20, 22 and provide a bearing surface 16S which may bear and roll on the surface of the rail 20. (One of the advantages of the conveyor 10 of this invention is that it being generally symmetrical about a central plane, it may be used with either side up. When the conveyor 10 is so inverted the surface 16S will bear on the rail 22). The bushing 16 also has a wheel-like portion 16W that bears on and rolls on the interior portion 18OP of the outer channel 18O. A second race and round rolling surface 16R is formed adjacent the wheel 16W. This surface 16A bears on and rolls on the rail surface 24 of the inner siderail member 18I. Likewise, the roller or wheel projection 16P forming within the outermost side of the race 16R bears against and rolls on the interior surface (at 18IP) of the channel-shaped member 18I.

Thus the weight of the rollers 12, axle 14 and any carried items is transferred to the bearing surfaces 20, 24, 18IP and 18OP of the channels 18I and 18P when the conveyor is in its compact or non-telescoping mode. As the conveyor is expanded the bushings at the extended end bear only on the surface of the inner channels 18I (FIGS. 1 & 2, right) while those on the non-extended end bear only on the outer channels 18O (FIG. 1, left).

Figure 5:
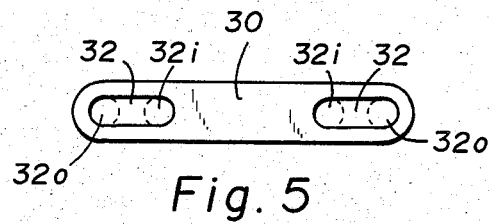
FIG. 5 is a side view at an enlarged scale of a part of the conveyor of FIGS. 1-4.

As best shown in FIGS. 3 and 4 the roller 12, bushing 16 and axle 14 units are inter-coupled by a series of links 30, one of which is shown in FIG. 5. Each end of an axle 14 (except for the terminal axles 14' (FIG. 1) at the extreme ends of the conveyor 10) has two of these links 30. Each of the links 30 has a pair of cam slots 32 sized to receive in a loose sliding fit (as a cam follower) the ends of the axles or rods 14 and allow them to move over a range of positions in the slot. As shown on the right side of FIGS. 2 & 3, when the roller units 11 are in the compressed state and axles 14 are in the center-most positions (32i in FIG. 5) of the slots 32. And when in the expanded or telescoping positions, as shown in the left side of FIGS. 2 and 3, the rods 14 have moved over to the outer most positions (32o in FIG. 5) of the slot 32.

As shown best in FIG. 4 the links 30 are secured to the shaft or axle 14 by means of a snap ring or retaining washer 34 that is snap-fitted into a groove on rod 14. As shown, the links 30 are confined in a loose fit between the washer 34 and the outer surface of the bushing 16.

As shown in FIG. 1, the terminal axles 14' may be secured in place by having them longer than the other axles 14 and project through close fitting holes in the sides of the channels 18O and 18I as indicated at 140.

For ease in construction the bushings 16 are preferably splined into or otherwise secured to the axle 14. However, they may be rotationally secured therein by, for example, providing suitable snap rings and grooves.

It should be noted that the links 30 prevent the siderails of the conveyor 10 from overextending as they hold together the end rods 14' in the manner of a chain. The inner rails 18I may be extended to any intermediate distance from the length of the contracted unit (which is slightly larger than that of either of the channel members 18O or 18I) to the full extension allowed by the links 30 (which may approach nearly double that distance). While friction between the telescoping members 18O and 18I may be adequate for holding the conveyor at a desired extension within this range, suitable locking devices can also be employed to hold the members 18I and 18O a desired particular extension within the range. Also, while the overlap between the extended members 18O and 18I is preferably such as to prevent significant "sagging" of the two sections when in their extended positions, it should be apparent that legs or standards may be employed at this area to overcome any such problem or if desired because of the weight of the carried items.

It should now be apparent that a non-powered telescoping extensible conveyor has been disclosed wherein the expansion linkage mechanisms are safely enclosed within the siderails so that they present no danger to the operator or the goods conveyed. Further, the described conveyor provides no mechanism that rises above the plane of the top of the rollers to ensnare or hang up goods being conveyed. Further, the described conveyor can be used with either flat surface facing upward and may be easily extended, contracted and constructed.

Also it should be apparent that the described conveyor is economical to manufacture as it repeatedly employs parts, such as roller units 11 and the links 30, which are of identical size and shape to minimize tooling costs and inventory. Further as the standardized parts such as the link 30 may be stamped out, they can be made easily using readily available equipment with a minimum of tooling costs.

It should now be apparent that an easily used, economically manufactured and safe extensible conveyor has been described that has advantages over prior conveyors.

While one particular embodiment of the invention has been shown and described, it will be obvious to those skilled in the art that changes and modifications may be made without departing from the invention and, therefore, the aim in the appended claims is to cover all such changes and modifications as fall within the true spirit and scope of the invention.

As an example, the invention can easily be employed to provide even greater extension by, using a set of three or more channel member inter-telescoping siderails and three or more race spools or bushings with the third one nesting within the inner member.

Three such members can also be employed without any increase in extension length to provide greater rigidity to the extended conveyor.

I claim:

1. A telescopic roller conveyor over which items may move and which may be telescopically extended and retracted, comprising, in combination:
   two generally parallel but spaced-apart siderails, each formed of at least two generally channel-shaped members which are telescopically mounted together so that the siderails may extend from a contracted position to an extended position;
   a plurality of roller units spanning between said siderails sequentially along the length thereof, each of said roller units including:
   at least one roller,
   axle means for mounting said at least one roller, and
   a pair of bushings, one of said pair of bushings at each end of said axle means, one of said bushings being received in one of said two siderails, and the other of said bushings being received in the other of said two siderails, said bushings being mounted therein so as to allow the roller unit to move longitudinally along the siderails; and
   link means for interconnecting the sequence of roller units and allowing the spacing between adjacent roller units to vary over a limited distance, said link means being encased in said channel-shaped members during use, and during extension or contraction of the conveyor, so as to present no external, moving link-means parts that may interfere with the items carried by the conveyor or harm the user.

2. The telescopic roller conveyor of claim 1, wherein said siderails do not project above the level of the tops of said rollers and each member thereof defines an upstanding rail; and
   said bushings are secured to the axles and define races which are received in at least one of said rails, of said members, whereby the bushings serve to hold the siderails in their spaced apart array and to aid in connecting them to the roller units.

3. The telescopic roller conveyor of claim 2, wherein said link means comprises a plurality of individual links each of which span between two adjacent roller units and each of said roller units and link means together define a cam slot and follower which determine the range of spacing between adjacent roller units.

4. The telescopic roller conveyor of claim 3, wherein each of said links defines a pair of longitudinal slots and each of said followers is formed by projections of the axle means beyond said bushings so that each link receives one extension of the axle means of adjacent roller units in each one of its pair of longitudinal slots.

5. The invention of claim 2, wherein said channel-shaped members and roller units are formed to be symmetrical about a horizontal central plane so that said conveyor may be used with either side up.

6. The invention of claim 5, wherein said link means comprises a plurality of individual links each of which spans between two adjacent roller units and each of said roller units and links together define a cam slot and follower which determine the range of spacing between adjacent roller units.

7. The invention of claim 6, wherein each of said links defines a pair of longitudinal slots, and each of said followers are formed by projections of the axle means beyond said bushings so that each link receives one extension of the axle means of adjacent roller units in each one of its pair of longitudinal slots.

8. The invention of claim 7 wherein each of said axle means mounts a plurality of rollers such that the rollers on adjacent axles are in a staggered array so that said rollers interweave when said roller units are in their contracted arrangement.

* * * * *